United States Patent [19]

Hollingsworth

[11] Patent Number: 5,032,804
[45] Date of Patent: Jul. 16, 1991

[54] FREQUENCY AGILE TRANSMITTER ANTENNA COMBINER

[75] Inventor: Allen H. Hollingsworth, Hoffman Estates, Ill.

[73] Assignee: Motorola, Inc., Schaumburg, Ill.

[21] Appl. No.: 355,533

[22] Filed: May 22, 1989

[51] Int. Cl.$^5$ .............................................. H03H 7/46
[52] U.S. Cl. ..................................... 333/132; 370/123; 370/38
[58] Field of Search .............. 333/126, 129, 132, 134; 370/38, 69.1, 123

[56] References Cited

U.S. PATENT DOCUMENTS

| | | | |
|---|---|---|---|
| 2,888,554 | 5/1959 | Hansell | 333/132 X |
| 3,668,567 | 6/1972 | Rosen | 333/117 X |
| 4,109,202 | 8/1978 | Kudsia et al. | 333/134 X |
| 4,211,894 | 7/1980 | Watanabe et al. | 370/38 |
| 4,231,000 | 10/1980 | Schuegraf | 333/135 X |
| 4,375,622 | 3/1983 | Hollingsworth et al. | 333/126 |
| 4,688,259 | 8/1987 | Edridge | 333/132 X |
| 4,813,036 | 3/1989 | Whitehead | 370/69.1 X |

FOREIGN PATENT DOCUMENTS 295812 12/1988 European Pat. Off. ............ 333/251

Primary Examiner—Eugene R. LaRoche
Assistant Examiner—Benny Lee
Attorney, Agent, or Firm—Wayne J. Egan

[57] ABSTRACT

A frequency agile transmitter antenna combiner is disclosed that allows combining multiple transmitter outputs onto a single antenna feed where the transmitters are operated at multiple frequencies. According to the invention, a method is disclosed and an apparatus is described for receiving a plurality of RF signal inputs where each input may contain any of a predetermined set of frequencies. The input frequency is then coupled to a frequency splitter that couples the input frequency to a dedicated combiner that tends to isolate the RF inputs from each other. The signal is then coupled to a combiner output, and ultimately to a single antenna feed line.

18 Claims, 1 Drawing Sheet

FREQUENCY AGILE TRANSMITTER ANTENNA COMBINER

TECHNICAL FIELD

This invention pertains generally to radio frequency (RF) signal combiners, and more particularly to a multi-port RF signal combiner for combining outputs of transmitters onto antennas when the transmitters may be operated at more than one frequency.

BACKGROUND OF THE INVENTION

In radio systems, it is often desirable to combine a number of RF signals so that they may be transmitted from a single antenna. One reason why this might be desirable, for example, is that the transmitter site might not be large enough to accommodate separate antennas for each RF signal. Another reason why this might be desirable is that there might be a large number of RF signals and it is simply more cost-effective to combine them onto a single antenna feed.

In order to combine a number of RF signals from radio transmitters and couple them to a common antenna, each transmitter must be isolated from one another to prevent intermodulation and possible damage to the transmitters. Various prior RF signal combiner arrangements have been known for combining a multiplicity of RF signals for transmission by a single antenna. One such prior arrangement is the subject of U.S. Pat. No. 4,375,622, dated Mar. 1, 1983, entitled "Multiport Radio Frequency Signal Combiner," by joint inventors Allen H. Hollingsworth (the inventor of the present invention) and Alan G. Deutschle, and assigned to Motorola, Inc. (the assignee of the present application).

While prior combiners have been adequate for combining multiple transmitter outputs for a single antenna, however, the inventor is unaware of any prior combiner that is suitable for combining outputs of transmitters onto antennas where the transmitters may be operated at more than one frequency. This type of combiner would be advantageous, for example, for a trunked or cellular system application in which subscriber loading at a particular site may be sufficiently light so that a full complement of repeaters may not be warranted.

SUMMARY OF THE INVENTION

It is an object of the present invention to provide an RF signal combiner that supports combining multiple transmitter outputs onto a single antenna feed where the transmitters are operated at multiple frequencies. Accordingly, a method is disclosed and an apparatus is described whereby a frequency agile transmitter antenna combiner, according to the invention, receives a plurality of RF transmitter inputs, each input comprising any of a predetermined set, or group, of predetermined frequencies. Each input frequency is then coupled to a frequency selective splitter that selectively directs (or steers) each input frequency to a corresponding combiner that is dedicated to that frequency. This combiner acts to isolate the individual RF inputs from one another. The input frequency is then coupled to a frequency selective combiner and ultimately output to a common antenna feed line.

BRIEF DESCRIPTION OF THE DRAWINGS

A first embodiment of a frequency agile transmitter antenna combiner, according to the invention, is shown in FIG. 1.

DETAILED DESCRIPTION OF THE INVENTION

Figure 1:
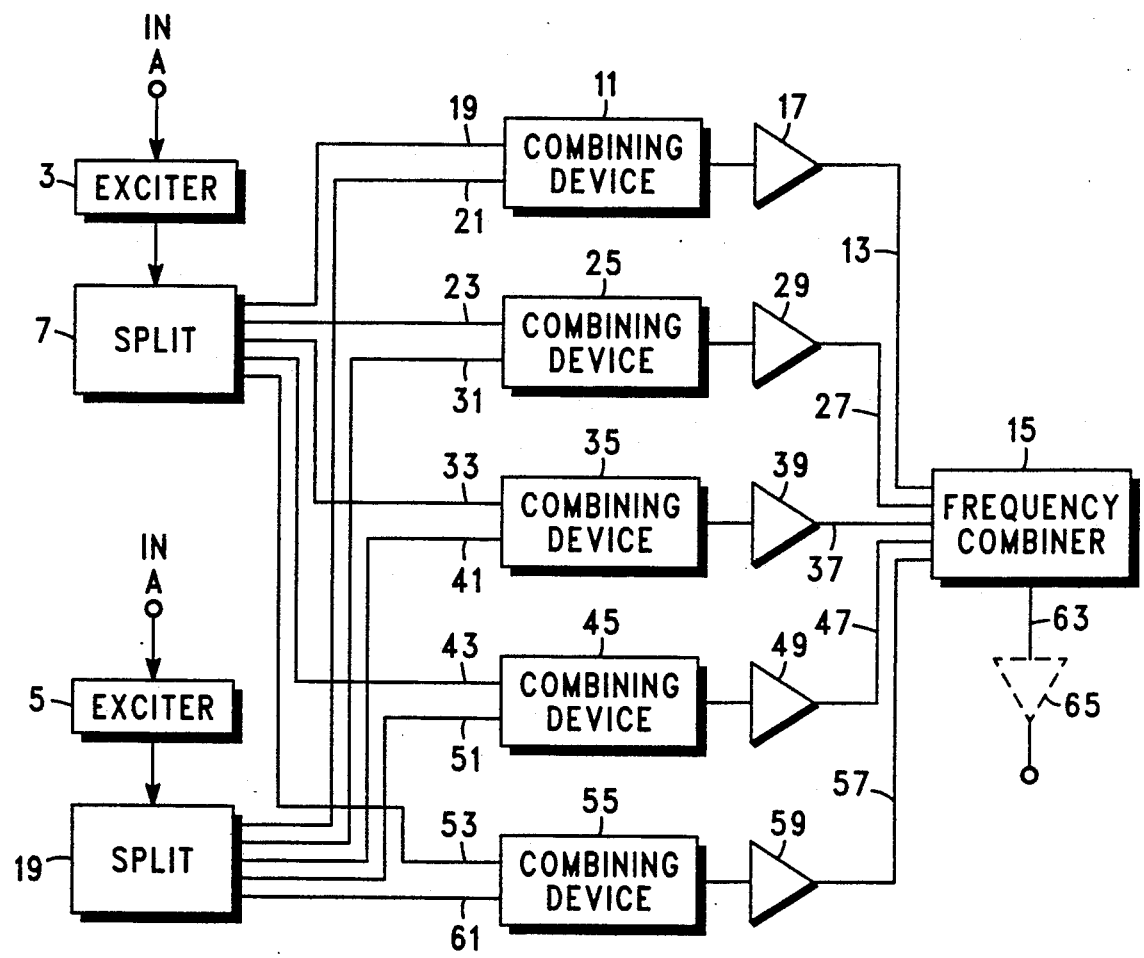

FIG. 1 is a block diagram that shows a first embodiment of a frequency agile transmitter antenna combiner, according to the invention.

The frequency agile combiner shown in FIG. 1 supports the use of five frequencies with only two transmitters. It will be appreciated, however, that the invention is equally applicable to systems using a first arbitrary number (designated as n) of frequencies and a second arbitrary number (designated as k) of transmitters. Using this nomenclature, it may be said that FIG. 1 shows an embodiment of the invention wherein $n=5$ and $k=2$.

Although the intent is to achieve frequency agility, it will be appreciated that the frequencies involved are particular discrete frequencies defined by the overall system of which FIG. 1 is only a part.

Referring now to FIG. 1, it is assumed the input A and/or the input B may contain any of five frequencies, $f_1$, $f_2$, $f_3$, $f_4$, and $f_5$. Either exciter 3 or exciter 5 may operate at any one of these frequencies.

Suppose, for example, that input A and exciter 3 is operating at $f_1$. In this case, the $f_1$ signal will be transmitted to a first frequency selective splitter 7, which acts to direct the signal to a first output 9 corresponding to $f_1$ which, in turn, couples the $f_1$ signal to a first combining device 11. The combining device 11, in turn, couples the $f_1$ signal to a corresponding $f_1$ input 13 of a frequency selective combiner 15 via a first power amplifier 17. The combiner 15 acts to couple the amplified $f_1$ signal to the frequency agile combiner output 63.

Suppose, on the other hand, that input B and exciter 5 is operating at $f_1$. In this case, the $f_1$ signal will be transmitted to a second frequency selective splitter 19, which acts to direct the signal to a first output 21 (of the second splitter 19) corresponding to $f_1$ which, in turn, couples the $f_1$ signal to the first combining device 11. The operation would then proceed as above, with the $f_1$ signal eventually appearing at the frequency agile combiner output 63.

Assume now that input A and exciter 3 is operating at $f_2$. In this case, the $f_2$ signal will be transmitted to the first frequency selective splitter 7, which directs the signal to a second output 23 corresponding to $f_2$ which, in turn, couples the $f_2$ signal to a second combining device 25. The combining device 25, in turn, couples the $f_2$ signal to a corresponding $f_2$ input 27 of combiner 15 via a second power amplifier 29. The combiner 15 finally couples the signal to the output 63.

Assume now that input B and exciter 5 is operating at $f_2$. In this case, the $f_2$ signal will be transmitted to the second frequency selective splitter 19, which acts to direct the signal to a second output 31 corresponding to $f_2$ which, in turn, couples the $f_2$ signal to the second combining device 25. The operation would then proceed as above, with the $f_2$ signal eventually appearing at the frequency agile combiner output 63.

Assume now that input A and exciter 3 is operating at $f_3$. In this case, the $f_3$ signal will be transmitted to the first frequency selective splitter 7, which directs the signal to a third output 33 corresponding to $f_3$ which, in turn, couples the $f_3$ signal to a third combining device 35. The combining device 35, in turn, couples the $f_3$ signal to a corresponding $f_3$ input 37 of combiner 15 via a third power amplifier 39. The combiner 15 finally couples the signal to the output 63.

Assume now that input B and exciter 5 is operating at $f_{f3}$. In this case, the $f_3$ signal will be transmitted to the second frequency selective splitter 19, which directs the signal to a third output 41 corresponding to $f_3$ which, in turn, couples the $f_3$ signal to the third combining device 35. The operation would then proceed as above, with the $f_3$ signal eventually appearing at the frequency agile combiner output 63.

Assume now that input A and exciter 3 is operating at $f_4$. In this case, the $f_4$ signal will be transmitted to the first frequency selective splitter 7, which directs the signal to a fourth output 43 corresponding to $f_4$ which, in turn, couples the signal to a fourth combining device 45. The combining device 45, in turn, couples the $f_4$ signal to a corresponding $f_4$ input 47 of combiner 15 via a fourth power amplifier 49. The combiner 15 finally couples the signal to the output 63.

Assume now that input B and exciter 5 is operating at $f_4$. In this case, the $f_4$ signal will be transmitted to the second frequency selective splitter 19, which directs the signal to a fourth output 51 corresponding to $f_4$ which, in turn, couples the $f_4$ signal to the fourth combining device 45. The operation then proceeds as above, with the $f_4$ signal eventually appearing at the frequency agile combiner output 63.

Assume now that input A and exciter 3 is operating at $f_5$. In this case, the $f_5$ signal will be transmitted to the first frequency selective splitter 7, which directs the signal to a fifth output 53 corresponding to $f_5$ which, in turn, couples the signal to a fifth combining device 55. The combining device 55, in turn, couples the $f_5$ signal to a corresponding $f_5$ input 57 of combiner 15 via a fifth power amplifier 59. The combiner 15 finally couples the signal to the output 63.

Assume now that input B and exciter 5 is operating at $f_5$. In this case, the $f_5$ signal will be transmitted to the second frequency selective splitter 19, which directs the signal to a fifth output 61 corresponding to $f_5$ which, in turn, couples the $f_5$ signal to the fifth combining device 55. The operation then proceeds as above, with the $f_5$ signal eventually appearing at the frequency agile combiner output 63.

The frequency selective splitter 7, the frequency selective splitter 19, and the frequency selective combiner 15 may be, for example, similar to (or identical to) the multiport radio frequency signal combiner described in U.S. Pat. No. 4,375,622, dated Mar. 1, 1983, entitled "Multiport Radio Frequency Signal Combiner," by joint inventors Allen H. Hollingsworth (the inventor of the present invention) and Alan G. Deutschle, and assigned to Motorola, Inc. (the assignee of the present application). The difference between the frequency splitter 7 (or 19) and the frequency combiner 15 is, of course, that the combiner 15 is operated in reverse (with respect to the splitter 7 or 19).

(The text of said U.S. Pat. No. 4,375,622 is hereby incorporated by reference.)

The combining devices 11, 25, 35, 45, and 55 may be of the Wilkinson type or else any type of power combining network that provides isolation between its input arms. The isolation is the essential feature here since, without isolation, the desired signal would be coupled directly back to the other exciter operating at a different frequency. If desired, additional isolation may be provided by adding circulators to the output of the exciters to minimize intermodulation.

Of the five power amplifiers 17, 29, 39, 49, and 59 shown in FIG. 1, only the amplifiers actually being used need be turned on at any one time. An alternative embodiment, of course, might utilize a single linear power amplifier 65 (shown in broken lines) in series with the combiner output 63 in lieu of the five individual amplifiers at the inputs 13, 27, 37, 47, and 57, as shown.

Inherently, a combining network of this type will be lossy. Therefore, as much of the network as possible should be put in front of the high power amplification.

Referring still to FIG. 1, it will be appreciated that the signal present at a particular input at any given time may contain more than one component signal at any of the five frequencies, $f_1$, $f_2$, $f_3$, $f_4$, and $f_5$.

The input signal at input A, for example, may simultaneously comprise two component signals at $f_1$ and $f_2$. In this case, the first frequency selective splitter 7 would separate the signal into its two component signals at $f_1$ and $f_2$ and then would proceed to couple the component signal at $f_1$ to the first combining device 11 and the component signal at $f_2$ to the second combining device 25.

Similarly, if the input B input signal simultaneously comprised three component signals at $f_3$, $f_4$, and $f_5$, then the second frequency selective splitter 19 would separate the signal into its three component signals at $f_3$, $f_4$, and $f_5$. The splitter 19 would then proceed to couple the component signal at $f_3$ to the third combining device 35, the component signal at $f_4$ to the fourth combining device 45, and the component signal at $f_5$ to the fifth combining device 55.

Ultimately, the frequency selective combiner 15 output signal 63 at any given time is responsive to the combination of all component signals presently input at all signal inputs. Using the above example, for instance, if two component signals at $f_1$ and $f_2$ were input at input A while three component signals at $f_3$, $f_4$ and $f_5$ were input at input B, the output signal 63 at that time then would be based on the combination of all five component signals at $f_1$, $f_2$, $f_3$, $f_4$ and $f_5$.

While various embodiments of the frequency agile transmitter combiner disclosure, according to the invention, have been described herein, the scope of the invention is defined by the following claims.

What is claimed is:

1. A method for combining a first input signal comprising a plurality of signal components at predetermined frequencies ($f_1$, $f_2$, . . . , $f_n$) and a second input signal comprising a plurality of signal components at said predetermined frequencies ($f_1$, $f_2$, . . . , $f_n$) to form an output signal, comprising the steps of:
   (a) separating said first input signal comprising a plurality of signal components at predetermined frequencies ($f_1$, $f_2$, . . . , $f_n$) into individual first input signal component signals at respective predetermined frequencies ($f_1$, $f_2$, . . . , $f_n$);
   (b) separating said second input signal comprising a plurality of signal components at predetermined frequencies ($f_1$, $f_2$, . . . , $f_n$) into individual second input signal component signals at respective predetermined frequencies ($f_1$, $f_2$, . . . , $f_n$);
   (c) combining said individual first input signal component signal at $f_1$ with said individual second input signal component signal at $f_1$ to form a composite component signal at $f_1$;

(d) repeating step (c) for every other individual signal component at predetermined frequencies ($f_1, f_2, \ldots, f_n$), thereby forming composite component signal at $f_2, \ldots$, composite component signal at $f_n$;

(e) combining said composite component signal at $f_1$, said composite component signal at $f_2, \ldots$, and said composite component signal at $f_n$; and (f) forming said output signal based on the results of step (e) above.

2. The method of claim 1 wherein said separating step (a) includes a preceding exciting step of amplifying said first input signal and said separating step (b) includes a preceding exciting step of amplifying said second input signal.

3. The method of claim 2 wherein said combining step (e) includes a preceding power amplifier step of amplifying said composite component signal at $f_1$, composite component signal at $f_2, \ldots$, composite component signal at $f_n$.

4. The method of claim 3 wherein said combining steps (c) and (d) are performed by using a plurality (n) of isolating-type power combining devices.

5. The method of claim 2 wherein said combining step (e) includes a following power amplifier step of amplifying said signal combiner output.

6. A frequency agile transmitter antenna combiner including means for combining a first input signal comprising a plurality of signal components at predetermined frequencies ($f_1, f_2, \ldots, f_n$) and a second input signal comprising a plurality of signal components at said predetermined frequencies ($f_1, f_2, \ldots, f_n$) to form a frequency agile transmitter antenna combiner output signal, said means comprising:

means for separating said first input signal comprising a plurality of signal components at predetermined frequencies ($f_1, f_2, \ldots, f_n$) into individual first input signal component signals at respective predetermined frequencies ($f_1, f_2, \ldots, f_n$) and for separating said second input signal comprising a plurality of signal components at predetermined frequencies ($f_1, f_2, \ldots, f_n$) into individual second input signal component signals at respective predetermined frequencies ($f_1, f_2, \ldots, f_n$);

means for combining said individual first input signal component signal at $f_1$ with said individual second input signal component signal at $f_1$ to form a composite component signal at $f_1$, and for combining every other individual first input signal component signal of said group of signals at predetermined frequencies ($f_1, f_2, \ldots, f_n$) with corresponding ones of the individual second input signal component signal at like frequency, thereby forming composite component signal at $f_2, \ldots$, composite component signal at $f_n$;

means for combining said composite component signal at $f_1$, said composite component signal at $f_2, \ldots$, and said composite component signal at $f_n$ and for forming said frequency agile transmitter antenna combiner output signal responsive thereto.

7. The frequency agile transmitter antenna combiner of claim 6 wherein said separating means includes exciter means for amplifying said first input signal and for amplifying said second input signal.

8. The frequency agile transmitter antenna combiner of claim 7 wherein said combining means includes power amplifier means for amplifying said composite component signal at $f_1$, composite component signal at $f_2, \ldots$, composite component signal at $f_n$.

9. The frequency agile transmitter antenna combiner of claim 8 wherein said combining means includes a plurality (n) of isolating-type power combining devices.

10. The frequency agile transmitter antenna combiner of claim 9 wherein said combining means includes at least one multiport radio frequency signal combiner.

11. The frequency agile transmitter antenna combiner of claim 7 wherein said combining means further includes power amplifier means for amplifying said frequency agile transmitter antenna combiner output.

12. A signal combiner, comprising:
means for receiving a predetermined number of input signals, each input signal at any of a predetermined group of frequencies,
means for separating each input signal into its frequency components;
means for combining all components of like frequencies, thereby forming a composite component at each frequency;
means for combining all composite components for all frequencies to form a common output signal responsive thereto.

13. A signal combiner, comprising:
k frequency selective splitters, each splitter designated as $splitter_x$, each $splitter_x$ having means for receiving input signals at any of n predetermined frequencies, each frequency designated $f_w$, where w varies from 1 to n, and n splitter outputs designated $splitter_x output_Y$, where Y varies from 1 to n, and having means for selectively coupling said $f_w$ to said $splitter_x output_y$, where $w = Y$, and means for isolating said frequency $f_w$ from any other splitter output,
n combiners, each combiner designated $combiner_z$, where z varies from 1 to n, each $combiner_z$ having k combiner inputs, each designated $combiner_z input_p$, a combiner output, and means for coupling said k inputs to said combiner output,
a frequency selective combiner having n inputs, each input designated frequency selective $combiner input_q$ where q varies from 1 to n, a frequency selective combiner output, and means for coupling said n frequency selective combiner inputs to respective said frequency selective combiner output,
said $combiner_z input_p$ where z varies from 1 to n, coupled to $splitter_x output_Y$ where $Y = z$,
said frequency selective $combiner input_q$ where q varies from 1 to n coupled to said $combiner_z$ output where $z = q$,
where x varies from 1 to k,
and where p varies from 1 to k.

14. The signal combiner of claim 13 wherein said $combiner_z$ has means for frequency isolating said $combiner_z input_p$ from all other $combiner_z input_p$s, where z varies from 1 to n.

15. The signal combiner of claim 14 wherein said $splitter_x$ includes exciter means for amplifying said input signal, where x varies from 1 to k.

16. The signal combiner of claim 15 wherein said $combiner_z$ includes power amplifier means coupled in series with said $combiner_z output$, where z varies from 1 to n.

17. The signal combiner of claim 16 wherein said $combiner_z$ comprises an isolating-type power combining device, where z varies from 1 to n.

18. The signal combiner of claim 15 wherein said frequency selective combiner includes power amplifier means coupled in series with said frequency selective combiner output.

* * * * *